United States Patent
Ramaswamy et al.

(10) Patent No.: US 10,261,699 B2
(45) Date of Patent: Apr. 16, 2019

(54) SYSTEMS AND METHODS FOR HARDWARE-BASED RAID ACCELERATION

(71) Applicant: Dell Products L.P., Round Rock, TX (US)

(72) Inventors: Srikrishna Ramaswamy, Austin, TX (US); Shyam T. Iyer, Austin, TX (US); Duk M. Kim, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 15/596,960

(22) Filed: May 16, 2017

(65) Prior Publication Data

US 2018/0335954 A1 Nov. 22, 2018

(51) Int. Cl.
*G06F 3/00* (2006.01)
*G06F 3/06* (2006.01)
*G06F 13/42* (2006.01)

(52) U.S. Cl.
CPC ............ *G06F 3/0611* (2013.01); *G06F 3/065* (2013.01); *G06F 3/0659* (2013.01); *G06F 3/0664* (2013.01); *G06F 3/0665* (2013.01); *G06F 3/0689* (2013.01); *G06F 13/4282* (2013.01); *G06F 2213/0026* (2013.01)

(58) Field of Classification Search
CPC ......... G06F 13/4282; G06F 2213/0026; G06F 3/0611; G06F 3/0659; G06F 3/0665; G06F 3/0689; G06F 13/4022; G06F 3/065; G06F 3/0664
See application file for complete search history.

(56) References Cited

U.S. PATENT DOCUMENTS

| | | | |
|---|---|---|---|
| 7,526,593 B2 * | 4/2009 | Mandal | G06F 13/404 710/310 |
| 9,274,901 B2 * | 3/2016 | Veerla | G06F 11/167 |

\* cited by examiner

*Primary Examiner* — Idriss N Alrobaye
*Assistant Examiner* — Richard B Franklin
(74) *Attorney, Agent, or Firm* — Jackson Walker L.L.P.

(57) ABSTRACT

In accordance with embodiments of the present disclosure, a method of transmitting data in an information handling system may include receiving, at a hardware logic device from a host system processor of the information handling system, an input/output (I/O) command; storing the I/O command in a controller memory of the hardware logic device that emulates to the host system processor a controller memory of a memory storage device; communicating a notification of the I/O command to a plurality of memory storage devices communicatively coupled to the hardware logic device; coalescing a plurality of command fetch requests received from individual memory storage devices of the plurality of memory storage devices into a coalesced command fetch request; communicating the coalesced command fetch request to the controller memory; and duplicating a command fetch response from the controller memory of the coalesced command fetch request to the plurality of memory storage devices.

20 Claims, 4 Drawing Sheets

FIG. 4

SYSTEMS AND METHODS FOR HARDWARE-BASED RAID ACCELERATION

TECHNICAL FIELD

This disclosure relates generally to information handling systems and more particularly to hardware-based redundant array of inexpensive disks (RAID) acceleration in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Peripheral component interconnect express (PCIe) is a local serial expansion bus for attaching hardware devices in an information handling system. The attached hardware devices can be a wide variety of devices, including, but not limited to, co-processors, graphic processing units (GPUs) and storage devices, such as solid state storage devices (SSD). The PCIe bus supports the functions found on a processor bus, but in a standardized format that is independent of any particular processor's native bus. PCIe is based on point-to-point topology, with separate serial links connecting every device to the host. A PCIe bus link supports full-duplex communication between any two endpoints, with no inherent limitation on concurrent access across multiple endpoints. PCIe communications are encapsulated in packets. The work of packetizing and depacketizing data and status-message traffic is handled by the transaction layer of the PCIe port.

One problem with current information handling systems is that the PCIe bus includes several PCIe endpoints that can utilize and/or manipulate data from the same physical/machine memory address. A duplication of upstream and downstream transactions can occur, resulting in increased data transmission times and latency. The duplication of transactions reduces the PCIe bandwidth capacity and increases system latency.

SUMMARY

In accordance with the teachings of the present disclosure, the disadvantages and problems associated with data processing in a PCIe device may be reduced or eliminated.

In accordance with embodiments of the present disclosure, a method of transmitting data in an information handling system may include receiving, at a hardware logic device from a host system processor of the information handling system, an input/output (I/O) command; storing the I/O command in a controller memory of the hardware logic device that emulates to the host system processor a controller memory of a memory storage device; communicating a notification of the I/O command to a plurality of memory storage devices communicatively coupled to the hardware logic device; coalescing a plurality of command fetch requests received from individual memory storage devices of the plurality of memory storage devices into a coalesced command fetch request; communicating the coalesced command fetch request to the controller memory; and duplicating a command fetch response from the controller memory of the coalesced command fetch request to the plurality of memory storage devices.

In accordance with these and other embodiments of the present disclosure, an information handling system may include a host system processor, a plurality of memory storage devices, and a hardware logic device communicatively coupled between the host system processor and the plurality of memory storage devices, the hardware logic device having control logic that facilitates data transmission, wherein the control logic causes the hardware logic device to: (i) receive from a host system processor of the information handling system an input/output (I/O) command; (ii) store the I/O command in a controller memory of the hardware logic device that emulates to the host system processor a controller memory of a memory storage device; (iii) communicate a notification of the I/O command to the plurality of memory storage devices; (iv) coalesce a plurality of command fetch requests received from individual memory storage devices of the plurality of memory storage devices into a coalesced command fetch request; (v) communicate the coalesced command fetch request to the controller memory; and (vi) duplicate a command fetch response from the controller memory of the coalesced command fetch request to the plurality of memory storage devices.

In accordance with these and other embodiments of the present disclosure, a method of transmitting data in an information handling system may include receiving, at a hardware logic device from a host system processor of the information handling system, an input/output (I/O) command, such that the hardware logic device emulates to the host system processor a controller memory of a memory storage device; duplicating and forwarding the I/O command to respective controller memories of a plurality of memory storage devices communicatively coupled to the hardware logic device; coalescing a plurality of read data responses to the duplicated I/O command into a coalesced read data response; and communicating the coalesced read data response to the host system processor.

In accordance with embodiments of the present disclosure, an information handling system may include a host system processor, a plurality of memory storage devices, and a hardware logic device communicatively coupled between the host system processor and the plurality of memory storage devices, the hardware logic device having control logic that facilitates data transmission, wherein the control logic causes the hardware logic device to: (i) receive an input/output (I/O) command, such that the hardware logic device emulates to the host system processor a controller memory of a memory storage device; (ii) duplicate and forward the I/O command to respective controller memories of the plurality of memory storage devices communicatively coupled to the hardware logic device; (iii) coalesce a plurality of read data responses to the duplicated I/O command into a coalesced read data response; and (iv) communicate the coalesced read data response to the host system processor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
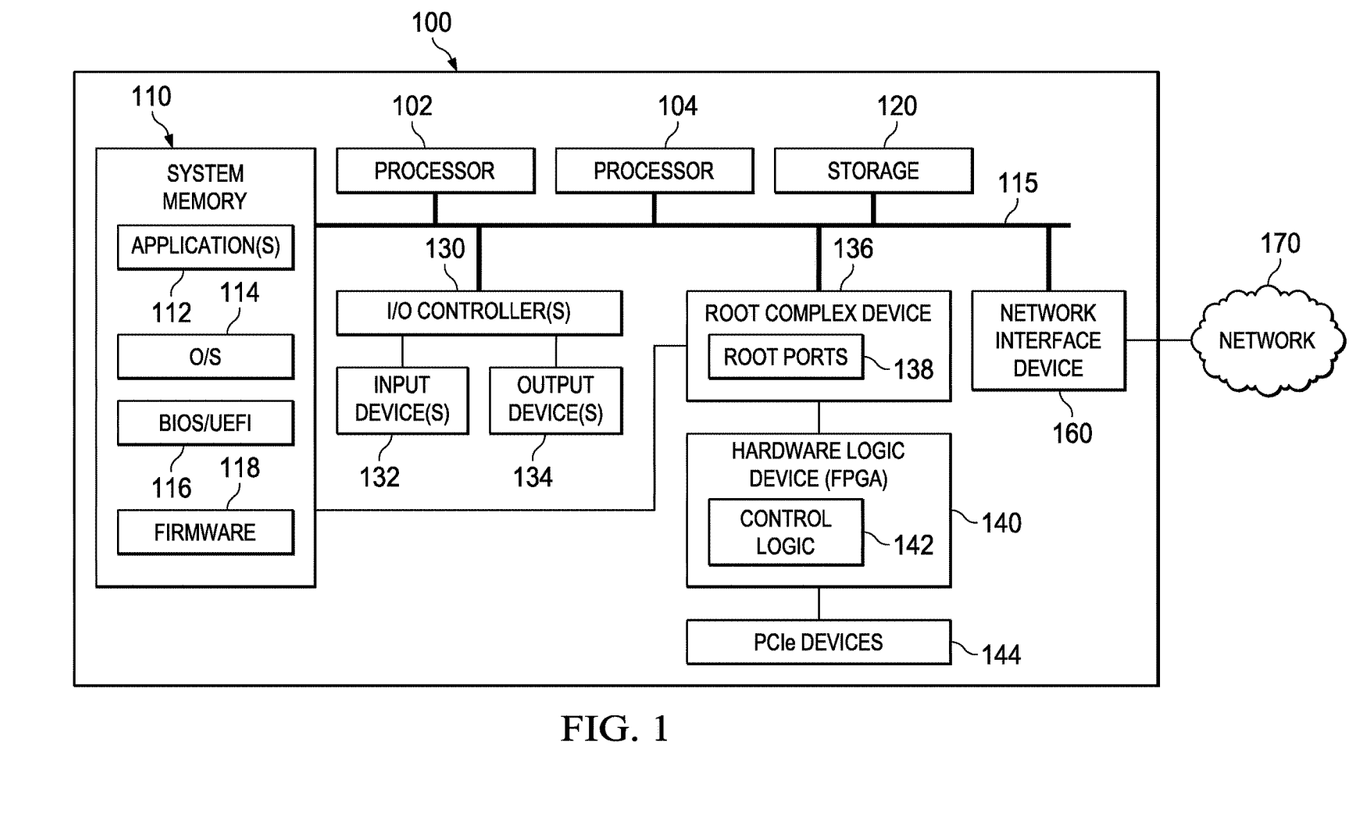
FIG. 1 illustrates an example information handling system within which various aspects of the disclosure may be implemented, in accordance with embodiments of the present disclosure.

Referring now to the drawings, FIG. 1 illustrates an example information handling system 100 within which various aspects of the disclosure may be implemented, in accordance with embodiments of the present disclosure. Example information handling system 100 may include one or more processors, such as processors 102 and 104. Processors 102 and 104 may be coupled to system memory 110 via system interconnect 115. System interconnect 115 may be interchangeably referred to as a system bus, in one or more embodiments. System interconnect 115 may also be coupled to storage 120 within which may be stored one or more software and/or firmware modules and/or data (not specifically shown). In one embodiment, storage 120 may be a hard drive or a solid state drive. The one or more software and/or firmware modules within storage 120 may be loaded into system memory 110 during operation of information handling system 100. As shown, system memory 110 may include therein a plurality of software and/or firmware modules including application(s) 112, operating system (O/S) 114, basic input output system/unified extensible firmware interface (BIOS/UEFI) 116 and firmware 118. In one or more embodiments, BIOS/UEFI 116 may comprise functionality associated with UEFI and may include UEFI images and drivers. The various software and/or firmware modules may have varying functionality when their corresponding program code is executed by processors 102 and/or 104 or other processing devices within information handling system 100.

Information handling system 100 may further include one or more input/output (I/O) controllers 130 which may support connection by, and processing of signals from, one or more connected input device(s) 132, such as a keyboard, mouse, touch screen, and/or microphone. I/O controllers 130 may also support connection to and forwarding of output signals to one or more connected output devices 134, such as a monitor, display device, and/or audio speaker(s).

Information handling system 100 may further include a root complex device 136 which may be coupled to system interconnect 115 and system memory 110. Information handling system 100 may further include a field programmable gate array (FPGA) 140, which may represent one embodiment of a hardware logic device, and is hereafter utilized as the specific example of a hardware logic device. Root complex device 136 may also be coupled to hardware logic device FPGA 140. While presented as an FPGA in the illustrative embodiments, in another embodiment, the hardware logic device may be an application specific integrated circuit (ASIC). Other types of integrated circuits (IC) may also be implemented as the hardware logic device, in other embodiments.

Root complex device 136 may have a plurality of root ports 138. Root complex device 136 may couple processor 102 and system memory 110 to a PCIe fabric. Root complex device 136 may support several PCIe root ports 138. Root ports 138 may be coupled to an endpoint device via FPGA 140. Root complex device 136 may generate transaction requests for processor 102 and transmit packets from root ports 138 and may also receive packets from root ports 138. The received packets may then be forwarded to system memory 110 or processor 102.

FPGA 140 may support coupling to and processing of signals from one or more coupled PCIe device(s) 144. FPGA 140 may include control logic 142 that can perform one or more of the methods described herein. In one embodiment, PCIe device(s) 144 may include graphic processing units and storage devices, such as solid state drives, including nonvolatile memory express (NVMe) devices. FPGA 140 may be coupled to root complex device 136. FPGA 140 may support transmission of data to and from PCI devices 144.

Information handling system 100 may further comprise a network interface device 160. Network interface device 160 may enable information handling system 100 to communicate and/or interface with other devices, services, and components that are located externally to information handling system 100. These devices, services, and components can interface with information handling system 100 via an external network, such as network 170, using one or more communication protocols. In one embodiment, a provisioned system/platform may comprise multiple devices located across a distributed network, and network interface device 160 may enable information handling system 100 to be coupled to these other devices. Network 170 may be a local area network, wide area network, personal area network, and the like, and connections to and/or between network 170 and information handling system 100 may be wired, wireless, or a combination thereof. For purposes of descriptive clarity, network 170 is shown in FIG. 1 as a single collective component for simplicity. However, it is appreciated that network 170 may comprise one or more direct connections to other devices as well as a more complex set of interconnections as may exist within a wide area network, such as the Internet.

Figure 2:
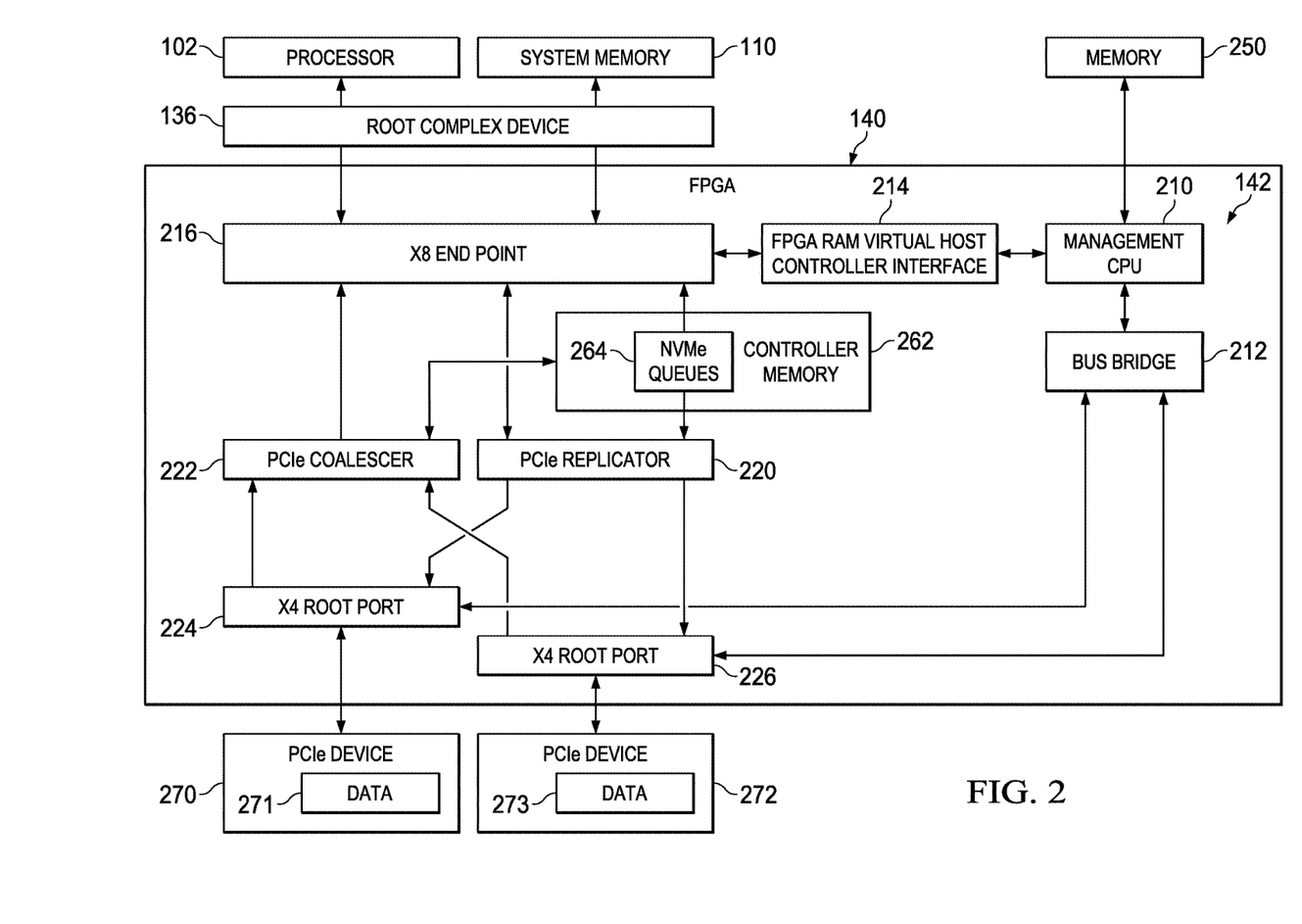
FIG. 2 illustrates an example block diagram of a hardware logic device such as a field programmable gate array (FPGA), in accordance with embodiments of the present disclosure.

FIG. 2 illustrates an example block diagram of FPGA 140, in accordance with embodiments of the present disclosure. FPGA 140 may comprise control logic 142 that may include a management central processing unit (CPU) 210 communicatively coupled to a bus bridge 212 and a FPGA random access memory (RAM) virtual host controller interface 214. Management CPU 210 may be used to enumerate and manage address mappings for PCIe (downstream) end points. FPGA RAM virtual host controller interface 214 may be communicatively coupled to a host virtual end point 216. Management CPU 210 may further be coupled to an external memory 250. Host virtual end point 216 may be coupled to root complex device 136, which may be coupled to processor 102 and/or system memory 110. As its name suggests, host virtual end point 216 may appear as an actual PCI endpoint to processor 102. Host virtual end point 216 may further be coupled to a PCIe transaction replicator 220 and a PCIe transaction coalescer 222. FPGA 140 may also include a controller memory 262 for storing NVMe queues 264.

PCIe replicator 220 may be coupled to root ports 224 and 226. PCIe coalescer 222 may also be coupled to root ports 224 and 226. Each of root ports 224 and 226 may further be coupled to bus bridge 212. Root port 224 may also be coupled to PCIe device 270, and root port 226 may also be coupled to PCIe device 272. During data transmission between processor 102 and PCIe devices 270 and 272, PCIe replicator 220 and PCIe coalescer 222 may function to achieve wire-level coalescing and replication of PCIe transactions upstream (to processor 102 and/or controller memory 262) and downstream (to PCIe devices 270 and 272 from processor and/or controller memory 262), respectively, as described in greater detail herein. PCIe device 270 may include data 271 and PCIe device 272 may include data 273. In some embodiments, data 271 and data 273 may be substantially the same data (i.e., duplicated), such that PCIe device 270 and PCIe device 272 share substantially similar data. In another embodiment, PCIe device 270 and PCIe device 272 may include data 271 and data 273 that are not duplicated. In these and other embodiments, PCIe devices 270 and 272 may be NVMe devices that are used in a redundant array of independent disks (RAID) configuration such that all of the data in PCIe device 270 is substantially duplicated in PCIe device 272.

Figure 3:
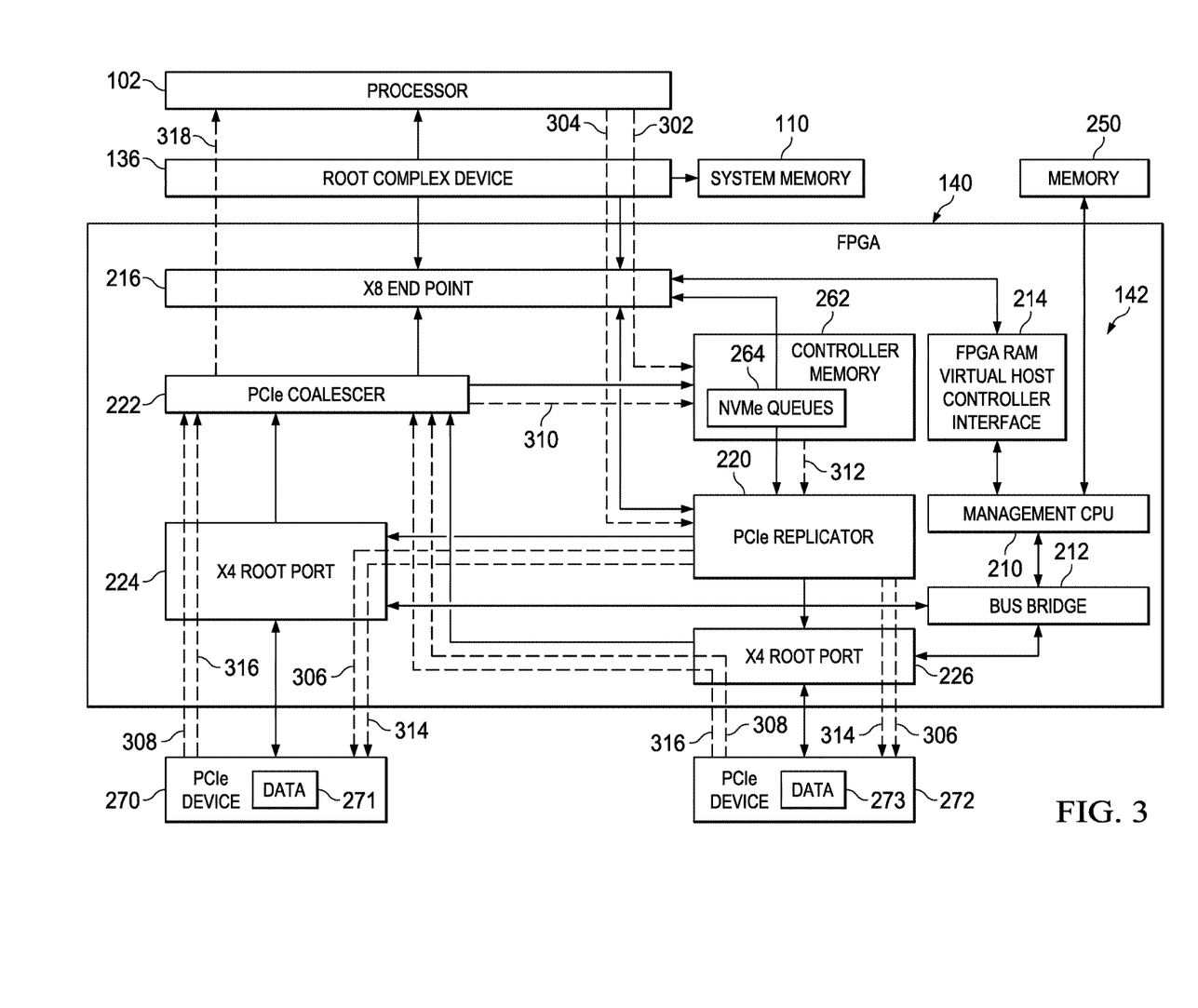
FIG. 3 illustrates a diagrammatic view depicting an example method of processing an input/output (I/O) command from a host system to PCIe devices using an FPGA having controller memory for emulating controller memory of the PCIe devices, in accordance with embodiments of the present disclosure.

FIG. 3 illustrates a diagrammatic view depicting an example method of processing an input/output (I/O) command from a host system comprising processor 102 to PCIe devices 270, 272 using FPGA 140 having controller memory 262 for emulating controller memory of a PCIe device 270, 272, in accordance with embodiments of the present disclosure. Various steps performed in the example method are shown by dashed lines with numeric labels in FIG. 3. At step 302, processor 102 may write an I/O command to NVM queues 264 stored in controller memory 262. At step 304, processor 102 may write a doorbell to PCIe replicator 220. At step 306, in response to receipt of the doorbell from processor 102, PCIe replicator 220 may replicate the doorbell to each of PCIe device 270 and PCIe device 272. At step 308, in response to receipt of the replicated doorbells, each of PCIe device 270 and PCIe device 272 may issue a fetch intended for NVMe queues 264, but such fetches may be received by PCIe coalescer 222.

At step 310, PCIe coalescer 222 may coalesce the two fetches and communicate the coalesced fetch to NVM queues 264 of controller memory 262. PCIe coalescer 222 may perform the coalesce operation by issuing a single fetch to NVM queues 264 of controller memory 262 responsive to receiving the first of the two fetches communicated from PCIe device 270 and PCIe device 272, and may intercept and discard the second fetch.

At step 312, in response to the coalesced fetch, NVMe queues 264 may communicate a fetch response to PCIe replicator 220 which includes the I/O command from processor 102. At step 314, in response to receiving the fetch response, PCI replicator 220 may replicate the fetch response to each of PCI device 270 and PCI device 272. At step 316, if the I/O command is a read request, in response to receiving the replicated fetch responses, each of PCI device 270 and PCI device 272 may respond with data responsive to the read request and communicate such data to PCIe coalescer 222.

At step 318, PCIe coalescer 222 may coalesce the read data responses and communicate the coalesced read data to processor 102. In some embodiments, PCIe coalescer 222 may perform the coalesce operation by forwarding read data responsive to receiving the first of the two read data responses communicated from PCIe device 270 and PCIe device 272, and may intercept and discard the read data received second. In other embodiments, PCIe coalescer 222 may include a "round robin" mechanism to alternately read between PCIe device 270 and PCIe device 272 based on any suitable factors.

Figure 4:
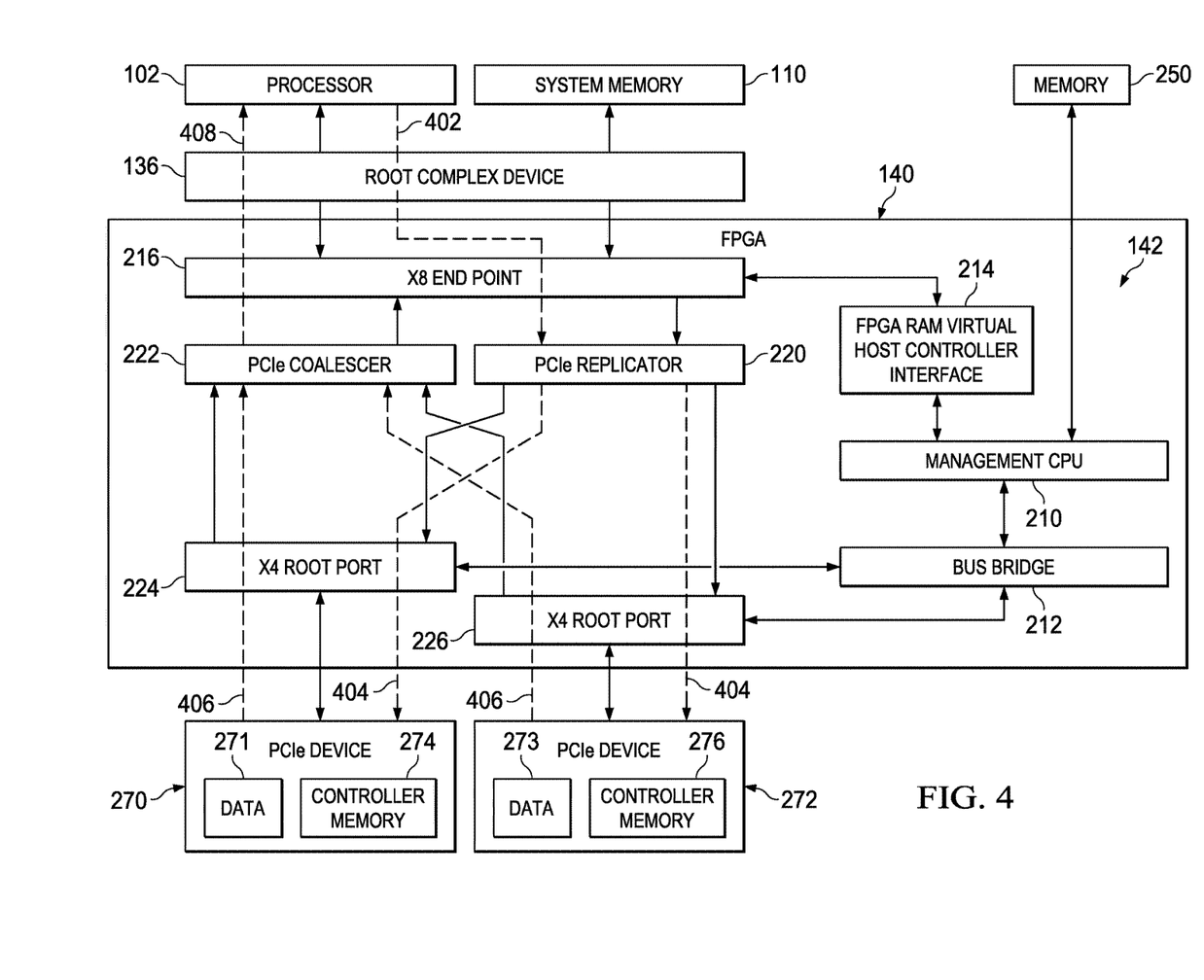
FIG. 4 illustrates a diagrammatic view depicting an example method of processing an input/output (I/O) command from a host system to PCIe devices using an FPGA wherein the PCIe devices comprise respective controller memories, in accordance with embodiments of the present disclosure.

FIG. 4 illustrates a diagrammatic view depicting an example method of processing an input/output (I/O) command from a host system comprising processor 102 to PCIe devices 270, 272 using FPGA 140 wherein PCIe devices 270, 272 include respective controller memories 274, 276, in accordance with embodiments of the present disclosure. Various steps performed in the example method are shown by dashed lines with numeric labels in FIG. 4.

FPGA 140 shown in FIG. 4 may be similar to that of FPGA 140 of FIGS. 2 and 3, except that FPGA 140 may not include controller memory 264. Also in FIG. 4, PCI devices 270, 272 may include respective controller memories 274, 276, as opposed to FIG. 3 wherein PCI devices 270, 272 were without controller memories, but instead such controller memory function was emulated by controller memory 264 shown in FIG. 3.

At step 402, processor 102 may write an I/O command and as associated doorbell to PCI replicator 220 which may emulate a controller memory (e.g., 274, 276) of a PCIe device with respect to processor 102. At step 404, in response to receipt of the I/O command and the doorbell from processor 102, PCIe replicator 220 may replicate the command and doorbell to each of controller memories 274 and 276 advertised by PCIe device 270 and PCIe device 272. At step 406, for a read I/O command, in response to receipt of the replicated doorbells and commands, each of PCIe device 270 and PCIe device 272 may respond with data responsive to the read request and communicate such data to PCIe coalescer 222.

At step 408, PCIe coalescer 222 may coalesce the read data responses and communicate the coalesced read data to processor 102. In some embodiments, PCIe coalescer 222 may perform the coalesce operation by forwarding read data responsive to receiving the first of the two read data responses communicated from PCIe device 270 and PCIe device 272, and may intercept and discard the read data received second. In other embodiments, PCIe coalescer 222 may include a "round robin" mechanism to alternately read between PCIe device 270 and PCIe device 272 based on any suitable factors.

In the above described methods and figures, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described may be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system."

Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that may contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of transmitting data in an information handling system, the method comprising:
    receiving, at a hardware logic device from a host system processor of the information handling system, an input/output (I/O) command;
    storing the I/O command in a controller memory of the hardware logic device that emulates to the host system processor a controller memory of a memory storage device;
    communicating a notification of the I/O command to a plurality of memory storage devices communicatively coupled to the hardware logic device;
    coalescing a plurality of command fetch requests received from individual memory storage devices of the plurality of memory storage devices into a coalesced command fetch request;
    communicating the coalesced command fetch request to the controller memory; and
    duplicating a command fetch response from the controller memory of the coalesced command fetch request to the plurality of memory storage devices.

2. The method of claim 1, further comprising:
    coalescing a plurality of read data responses to the duplicated command fetch responses into a coalesced read data response; and
    communicating the coalesced read data response to the host system processor.

3. The method of claim 2, wherein coalescing a plurality of read data responses comprises forwarding a first received of the plurality of read data responses as the coalesced read data response.

4. The method of claim 1, wherein coalescing a plurality of command fetch requests comprises forwarding a first received of the plurality of command fetch requests as the coalesced command fetch request.

5. The method of claim 1, wherein the plurality of memory storage devices comprise Peripheral Component Interconnect Express (PCIe) devices.

6. The method of claim 1, wherein the hardware logic device comprises a field-programmable gate array.

7. An information handling system comprising:
a host system processor;
a plurality of memory storage devices; and
a hardware logic device communicatively coupled between the host system processor and the plurality of memory storage devices, the hardware logic device having control logic that facilitates data transmission, wherein the control logic causes the hardware logic device to:
receive from a host system processor of the information handling system an input/output (I/O) command;
store the I/O command in a controller memory of the hardware logic device that emulates to the host system processor a controller memory of a memory storage device;
communicate a notification of the I/O command to the plurality of memory storage devices;
coalesce a plurality of command fetch requests received from individual memory storage devices of the plurality of memory storage devices into a coalesced command fetch request;
communicate the coalesced command fetch request to the controller memory; and
duplicate a command fetch response from the controller memory of the coalesced command fetch request to the plurality of memory storage devices.

8. The information handling system of claim 7, wherein the control logic further causes the hardware logic device to:
coalesce a plurality of read data responses to the duplicated command fetch responses into a coalesced read data response; and
communicate the coalesced read data response to the host system processor.

9. The information handling system of claim 8, wherein coalescing a plurality of read data responses comprises forwarding a first received of the plurality of read data responses as the coalesced read data response.

10. The information handling system of claim 7, wherein coalescing a plurality of command fetch requests comprises forwarding a first received of the plurality of command fetch requests as the coalesced command fetch request.

11. The information handling system of claim 7, wherein the plurality of memory storage devices comprise Peripheral Component Interconnect Express (PCIe) devices.

12. The information handling system of claim 7, wherein the hardware logic device comprises a field-programmable gate array.

13. A method of transmitting data in an information handling system, the method comprising:
receiving, at a hardware logic device from a host system processor of the information handling system, an input/output (I/O) command, such that the hardware logic device emulates to the host system processor a controller memory of a memory storage device;
duplicating and forwarding the I/O command to respective controller memories of a plurality of memory storage devices communicatively coupled to the hardware logic device;
coalescing a plurality of read data responses to the duplicated I/O command into a coalesced read data response; and
communicating the coalesced read data response to the host system processor.

14. The method of claim 13, wherein coalescing a plurality of read data responses comprises forwarding a first received of the plurality of read data responses as the coalesced read data response.

15. The method of claim 13, wherein the plurality of memory storage devices comprise Peripheral Component Interconnect Express (PCIe) devices.

16. The method of claim 13, wherein the hardware logic device comprises a field-programmable gate array.

17. An information handling system comprising:
a host system processor;
a plurality of memory storage devices; and
a hardware logic device communicatively coupled between the host system processor and the plurality of memory storage devices, the hardware logic device having control logic that facilitates data transmission, wherein the control logic causes the hardware logic device to:
receive an input/output (I/O) command, such that the hardware logic device emulates to the host system processor a controller memory of a memory storage device;
duplicate and forward the I/O command to respective controller memories of the plurality of memory storage devices communicatively coupled to the hardware logic device;
coalesce a plurality of read data responses to the duplicated I/O command into a coalesced read data response; and
communicate the coalesced read data response to the host system processor.

18. The information handling system of claim 17, wherein coalescing a plurality of read data responses comprises forwarding a first received of the plurality of read data responses as the coalesced read data response.

19. The information handling system of claim 17, wherein the plurality of memory storage devices comprise Peripheral Component Interconnect Express (PCIe) devices.

20. The information handling system of claim 17, wherein the hardware logic device comprises a field-programmable gate array.

* * * * *